UNITED STATES PATENT OFFICE.

FRANK CHASE COLBY, OF HOUSTON, TEXAS.

DESICCATED-MEAT COMPOUND AND PROCESS OF MAKING SAME.

SPECIFICATION forming part of Letters Patent No. 621,227, dated March 14, 1899.

Application filed April 18, 1898. Serial No. 678,065. (No specimens.)

*To all whom it may concern:*

Be it known that I, FRANK CHASE COLBY, a citizen of the United States, residing at Houston, in the county of Harris and State of Texas, have invented a new and useful Compound, of which the following is a specification.

My invention relates to compounds, and particularly to condensed foods, and has for its object to provide a condensed chilli-concarne compound adapted for packing and storing under such conditions as to insure its preservation in any climate and for an indefinite length of time.

The ingredients of the compound embodying my invention are as follows: beef, (eighty-five per cent. lean and fifteen per cent. fat,) one pound; cumin-seed, one teaspoonful; origanum herbs, one teaspoonful; garlic, (chopped,) one teaspoonful; table-salt, two teaspoonsful; chilli-peppers, one and one-half ounces.

In order to combine the above ingredients in such a form as to insure the preservation thereof with their peculiar flavors for an indefinite length of time and under varying conditions of climate, it is necessary to prepare the same so that the moisture, particularly of the body ingredient or the meat, shall be driven off and whereby the aromatic flavors of such ingredients as origanum and garlic shall be absorbed by the said body material, which practically forms the vehicle of the compound. Therefore I proceed to desiccate the beef and simultaneously render the beef fat, preferably in the same vessel and with said lean and fat thoroughly mingled, by subjecting said material to a brazing operation or by exposing the same in a shallow brazing-pan to a slow fire. In order that this operation may be complete, all of the moisture of the lean being driven off or evaporated and the fat being rendered, I first chop or comminute the lean and fat into small blocks of approximately three-eighth-inch cubes. After the desiccating or brazing operation has proceeded until only the solid matter remains I add the above-mentioned proportions of salt, pulverized cumin-seed, pulverized origanum herbs, and chopped garlic and stir thoroughly in order to insure an efficient commingling of the flavorants and seasoning materials with the vehicle, consisting of the meat. The desiccating or brazing operation is continued for a short time after the addition of the flavorants, and by reason of the thorough mixing of the latter with the vehicle (the latter having been dried previous to the addition of the flavorants) any aromatic vapors thrown off by such of the ingredients as origanum and garlic will be absorbed, and thus permanently retained in the mixture. In other words, during the short length of time in which the flavorants remain exposed to the evaporating heat the vapors driven off from the same are absorbed by the previously-dried vehicle, with which said flavorants are thoroughly mingled. The next step in the process, following closely (as at an interval of about ten minutes) after the addition of the above-mentioned flavorants, is the addition of a chilli-pepper paste formed by pounding and macerating previously-dried chilli-peppers in sufficient water to be thoroughly absorbed thereby. The formation of the chilli-pepper paste may be accomplished efficiently in a metal churn or mortar, the pounding being accomplished by means of a plunger or dasher which is perforated. When the complete saturation and maceration of the chilli-peppers have been accomplished and at the end of the above-mentioned interval following the introduction of the flavorants to the dried meat, the paste should be added and thoroughly and quickly mingled with the previously-formed mixture, whereby the granules or blocks of the vehicle are coated with the paste to effectually retain the characteristic flavors of the previously-added ingredients. The desiccating or brazing operation is continued after the addition of the paste for another short interval of about ten minutes, after which the compound is ready for packing in suitable vessels and sealing. Said compound may be packed in tubs, buckets, or glass jars, which should be closed, so as to exclude air. It will be understood, of course, that the compound after removal from the brazing-pan and before introduction into the receptacles must be allowed to cool, and when cold it will be solid, forming a thick pasty mass, its pasty condition obviously being due to the chilli-pepper paste, which is added shortly before the termination of the brazing operation.

In preparing the compound for serving one part thereof to one and one-half parts of boiling water should be placed in a sauce-pan and thoroughly mingled until of a semiliquid consistency and then allowed to stew or simmer, the result being served hot.

It will be understood that changes in the proportions of the ingredients may be resorted to without departing from the spirit or sacrificing the advantages of my invention; but those above mentioned I have found to produce a compound which in taste and qualities is practically indentical with the most approved Mexican chilli con carne, and the method of compounding the same, as clearly described, provides for the preservation thereof in a condensed bulk and in a state suitable for immediate preparation for use.

Having described my invention, what I claim is—

1. A desiccated compound, consisting of granules of meat, impregnated with flavorants, and coated with an air-excluding paste, combined substantially as and in the proportions specified.

2. A desiccated compound, consisting of granules of beef, impregnated with cumin-seed, origanum herbs and garlic, and coated with chilli-pepper paste, substantially as and in the proportions specified.

3. The herein-described process of preparing chilli con carne, the same consisting in impregnating meat with flavorants, then coating the impregnated meat with an air-excluding paste, and finally desiccating the coated meat, substantially as specified.

4. The herein-described process of preparing chilli con carne, the same consisting in desiccating meat, then impregnating the desiccated meat with aromatic flavorants, then coating the impregnated meat with an air-excluding paste, and finally desiccating the coated meat, substantially as specified.

5. The herein-described process of preparing chilli con carne, the same consisting in impregnating desiccated granules of meat with flavorants, then coating the impregnated granules with an air-excluding paste, and finally desiccating the paste-coated granules, substantially as specified.

6. The herein-described process of preparing chilli con carne, the same consisting in comminuting meat to form granules, then desiccating the granules of meat, then impregnating the desiccated granules of meat with aromatic flavorants, then coating the impregnated granules with an air-excluding paste containing chilli-pepper, and finally desiccating the coated granules, substantially as specified.

7. The herein-described process of preparing chilli con carne, the same consisting in granulating beef lean and beef fat, in substantially the proportions specified; desiccating or brazing the mixture of said ingredients, then adding and mixing pulverized cumin-seed, origanum herbs, and garlic, with salt; continuing the desiccating or brazing operation to cause the absorption, by the previously-desiccated meat, of the vapors of said flavorants; then adding a chilli-pepper paste, consisting of macerated chilli-peppers moistened with water, and thoroughly mixing said paste with the comminuted and desiccated meat, to cause the coating of the granules; continuing the desiccating operation until the coating of chilli-pepper paste is partly dried; and finally cooling the mass, substantially as specified.

In testimony that I claim the foregoing as my own I have hereto affixed my signature in the presence of two witnesses.

FRANK CHASE COLBY.

Witnesses:
   GEO. WILLIAMS,
   P. E. FAURE.